Nov. 20, 1951

G. SHOCKEY 2,575,430

FISH LURE

Filed May 2, 1946

INVENTOR.

GLEN SHOCKEY,
BY *Victor J. Evans & Co.*

ATTORNEYS

Nov. 20, 1951  G. SHOCKEY  2,575,430
FISH LURE

Filed May 2, 1946  2 SHEETS—SHEET 2

INVENTOR.
GLEN SHOCKEY
BY *Victor J. Evans & Co.*
ATTORNEYS

Patented Nov. 20, 1951

2,575,430

UNITED STATES PATENT OFFICE 2,575,430

FISH LURE

Glen Shockey, Chicago, Ill.

Application May 2, 1946, Serial No. 666,680

3 Claims. (Cl. 43—42.06)

The invention relates to improvements in fish lures or artificial baits and more particularly to a fish lure utilizing the passage of water there through to produce a side sway or wabble thereby more nearly simulating the actions of live fish.

An object of this invention is to provide a device which by simulation of live fish will provide a more attractive and enticing lure than that in use at the present time.

Other objects of this invention are to provide a lure which will rise and dive, and at the same time sway from side to side; to provide a lure having a plurality of staggered rotatable blades mounted therein; to provide a lure which will be constantly active as it is drawn through the water; and to provide a lure which will be equally active whether used for casting or trolling purposes.

Another object of this invention is to provide a device that is simple in construction, efficient in operation and can be manufactured inexpensively.

With the above and other objects and advantages in view the invention consists of the novel details of construction, arrangement and combination of parts more fully hereinafter described, claimed and illustrated in the accompanying drawings in which:

Figure 1:
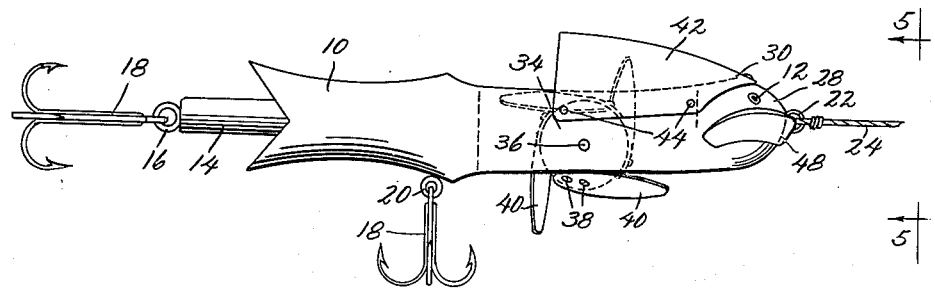
Figure 1 is a side elevation of an embodiment of the invention.
Figure 2:
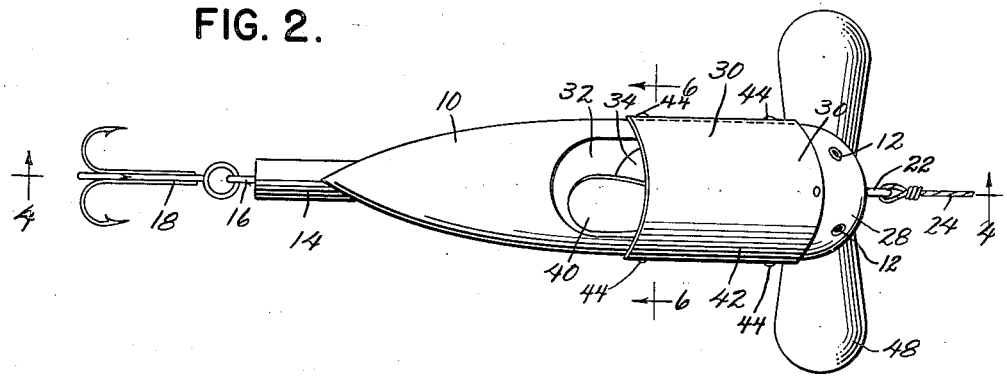
Figure 2 is a top plan view thereof.
Figure 3:
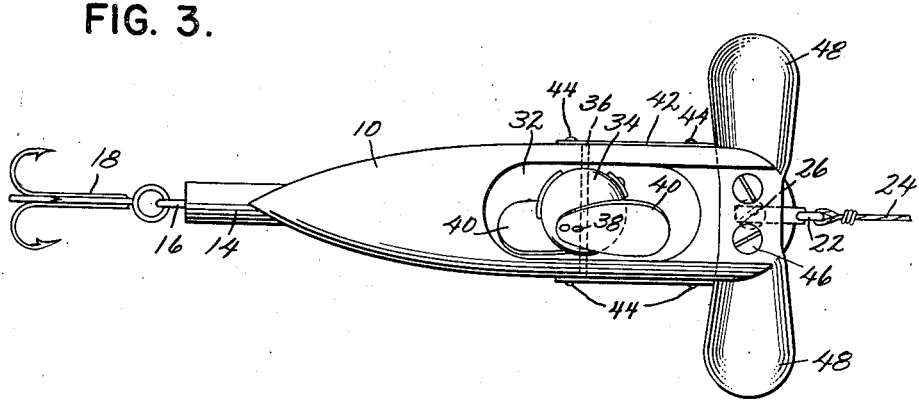
Figure 3 is a bottom view.
Figure 4:
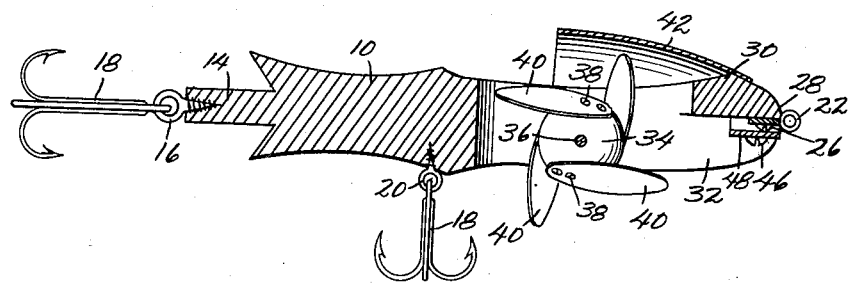
Figure 4 is a longitudinal sectional view through the line taken on the line 4—4 of Figure 2.
Figure 5:
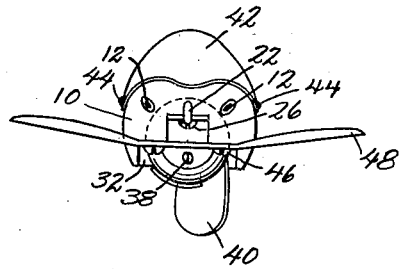
Figure 5 is a front view taken on the line 5—5 of Figure 1.
Figure 6:
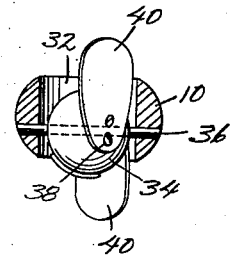
Figure 6 is a partial cross-sectional view through the line taken on the line 6—6 of Figure 2.

Referring more in detail to the drawings the numeral 10 designates a suitably buoyant body which is shaped and contoured to the likeness of a small fish and is provided on the front or head end with artificial eyes 12. Extending rearwardly of the tail end of the body 10 is a cylindrical projection 14 which is provided with a screw eye 16 to receive a treble or double fish hook 18, and at the approximate center of the under side of the body 10 a screw eye 20 is provided for receiving a second double or treble fish hook 18. The head end is provided with an eye 22 to receive the leader or line 24, the eye being secured to the body by a screw 26.

The body 10 is provided with an elongated slot or cavity 32 which opens through the upper and lower sides of the body. The lower portion of the slot or cavity 32 extends from the front end of the body 10 to a point slightly rearward of the transverse center of the body. A spherical body or hub 34 is rotatably supported by an axle 36 within the slot or cavity 32. The axle 36 extends transversely of the body 10. A plurality of staggered blades 40 are secured by screws 38 to the spherical body or hub 34. The blades cause the body 34 to rotate as the lure is drawn through the water, the rotating of the body 34 imparting a side sway or wabble to the lure.

Mounted immediately over the cavity 32 and extending nearly the entire length thereof is the curved dome shaped hood or shield 42 which is secured to the body by fasteners 44 and is provided to prevent a counter acting stream from stabilizing spherical body 34.

Through the mouth of the body in right angular relation therewith is secured by means of screws 46 the inverted vane 48 which, simulating the wings of an airplane, imparts to the body a winged appearance and which provides diving and rising planes which cause the body to plunge and rise while at the same time wabbling from side to side.

The body thus formed will more nearly simulate the actions of live fish and will thus function to attract fish in a manner not available with lines in use at the present time.

It is believed the operation and usefulness of the device will be apparent to those skilled in the art and it is to be understood that various changes may be made in the details of construction, arrangement and combination of parts without departing from the spirit of the invention or the scope of the appended claims.

Having thus described the invention what is claimed as new and desired to be secured by Letters Patent is:

1. A fishing lure comprising an elongated body having a tail and head portion simulating a small fish and having an elongated slot in its forward end, gang hooks secured to the tail portion and to the lower portion of said body, an axle positioned transversely of said body and in said slot, a spherical hub mounted on said axle, blades secured to said hub, a curved dome shaped hood secured to the top of said body and partially covering said slot, and a vane having a pair of inverted dished shaped wing-like portions secured to the forward end of said body and extending transversely thereof.

2. A fishing lure comprising an elongated body formed to simulate a small fish and having a tail portion and a head portion and an elongated vertically disposed slot in the end of the head portion and extending therethrough whereby to form a passage for water therethrough, a cylindrical projection extending from said tail portion, gang hooks secured to the said projection and medially to the underside of said body, an axle mounted transversely of said body in said slot, a spherical hub rotatably mounted on said axle blades secured to said hub in staggered relation thereon adapted to be actuated by water passing through said slot, a tapering domed-shaped hood secured to the top of said body and partially covering said slot, and a vane having a pair of wing shaped portions secured to the head portion of said body and extending transversely of said body.

3. A device of the character described comprising a body formed to simulate small fish and having an elongated slot therein open at its forward end and extending approximately halfway of the body to provide a channel for the passage of water therethrough, a curved shield fixed to said body over the forward portion of said slot, an axle mounted in said slot transversely of said body, a spherical body rotatably mounted on said axle, blades secured to said spherical body in staggered relation thereto, so that the action of water passing through said slot is adapted to actuate said spherical body by means of impinging on said blades to cause wabbling motion of said first mentioned body, means on said first mentioned body for attaching hooks thereto and an inverted vane secured to the forward or head end of said first mentioned body.

GLEN SHOCKEY.

REFERENCES CITED

The following references are of record in the file of this patent:

UNITED STATES PATENTS

| Number | Name | Date |
|---|---|---|
| 1,441,059 | Brown | Jan. 2, 1923 |
| 1,639,766 | Fisher | Aug. 23, 1927 |
| 1,762,914 | Cornelius | June 10, 1930 |
| 2,112,901 | Anderson | Apr. 5, 1938 |
| 2,207,425 | Arbogast | July 9, 1940 |
| 2,229,369 | Buettner | Jan. 21, 1941 |
| 2,360,563 | Harman | Oct. 17, 1944 |
| 2,450,253 | Parnell | Sept. 28, 1948 |